United States Patent
Dunbar

(10) Patent No.: US 6,202,970 B1
(45) Date of Patent: Mar. 20, 2001

(54) DRIPPING OBJECT HOLDER

(76) Inventor: Ronald Dunbar, 15484 Hamlin Ave., Markham, IL (US) 60426

(*) Notice: Subject to any disclaimer, the term of this patent is extended or adjusted under 35 U.S.C. 154(b) by 0 days.

(21) Appl. No.: 09/384,551

(22) Filed: Aug. 27, 1999

(51) Int. Cl.[7] ................................................. A47K 1/08
(52) U.S. Cl. ........................ 248/311.3; 248/94; 248/694
(58) Field of Search ............................. 248/694, 311.3, 248/684, 146, 152, 174, 94, 176.1, 145.3, 145.6; 220/710, 571, 719, DIG. 6, 708, 574, 737; 249/97, 134

(56) References Cited

U.S. PATENT DOCUMENTS

| | | | |
|---|---|---|---|
| 1,461,156 | * | 7/1923 | Martin ........................................ 4/274 |
| 1,829,664 | * | 10/1931 | McKay ....................................... 211/2 |
| 2,162,224 | | 6/1939 | Legga . |
| 2,321,519 | * | 6/1943 | Rubinoff ................................ 220/737 |
| 2,486,907 | * | 11/1949 | Amberg et al. ..................... 248/145.3 |
| 2,487,712 | * | 11/1949 | Johnson et al. ..................... 248/145.3 |
| 2,509,132 | * | 5/1950 | Carew ................................ 248/145.3 |
| 2,632,708 | | 3/1953 | Sueskind . |
| 2,704,444 | * | 3/1955 | Carew ..................................... 220/1.5 |
| 2,729,080 | * | 1/1956 | Bennett .............................. 248/145.3 |
| 2,770,958 | * | 11/1956 | Carew ................................ 248/145.3 |
| 2,785,551 | * | 3/1957 | Holzwarth et al. ................ 248/145.3 |
| 2,803,550 | | 8/1957 | Ackalusky . |
| 2,980,039 | | 4/1961 | Jolly . |
| 3,008,678 | * | 11/1961 | Roumeliotis ....................... 248/145.3 |
| 3,459,296 | | 8/1969 | Berg . |
| 4,069,996 | * | 1/1978 | Koziol .................................. 248/146 |
| 4,226,355 | * | 10/1980 | Helfrich, Jr. ...................... 229/1.5 H |
| 4,290,573 | * | 9/1981 | Shapiro ................................ 248/152 |
| 5,224,646 | | 7/1993 | Biancosinn . |
| 5,515,998 | | 5/1996 | Wang . |
| 5,979,695 | * | 11/1999 | Valls et al. ............................ 220/666 |

* cited by examiner

*Primary Examiner*—Antia M. King
*Assistant Examiner*—Naschica S Morrison
(74) *Attorney, Agent, or Firm*—Barbara R. Greenberg

(57) ABSTRACT

A holder for edible and inedible objects, such as pickles, lolly pops, frozen confection bars and objects to be painted, having oppositely disposed cone shaped receptacles joined at the cone shaped receptacle apexes by a hollow stem, a handle affixed to the receptacles and object support structures contained within the cone shaped receptacles. The object support structures have proximal rod shaped members that snap into the hollow stem and distal end means for holding objects including a pointed end portion and a slotted end portion terminating in a circular plate. The circular plate fits snuggly inside the cone shaped receptacle. Accessory support structures that telescopically slip over the pointed distal end portion provide additional means for holding objects including a distal end slot, a distal end clamp and a distal end tube.

6 Claims, 2 Drawing Sheets

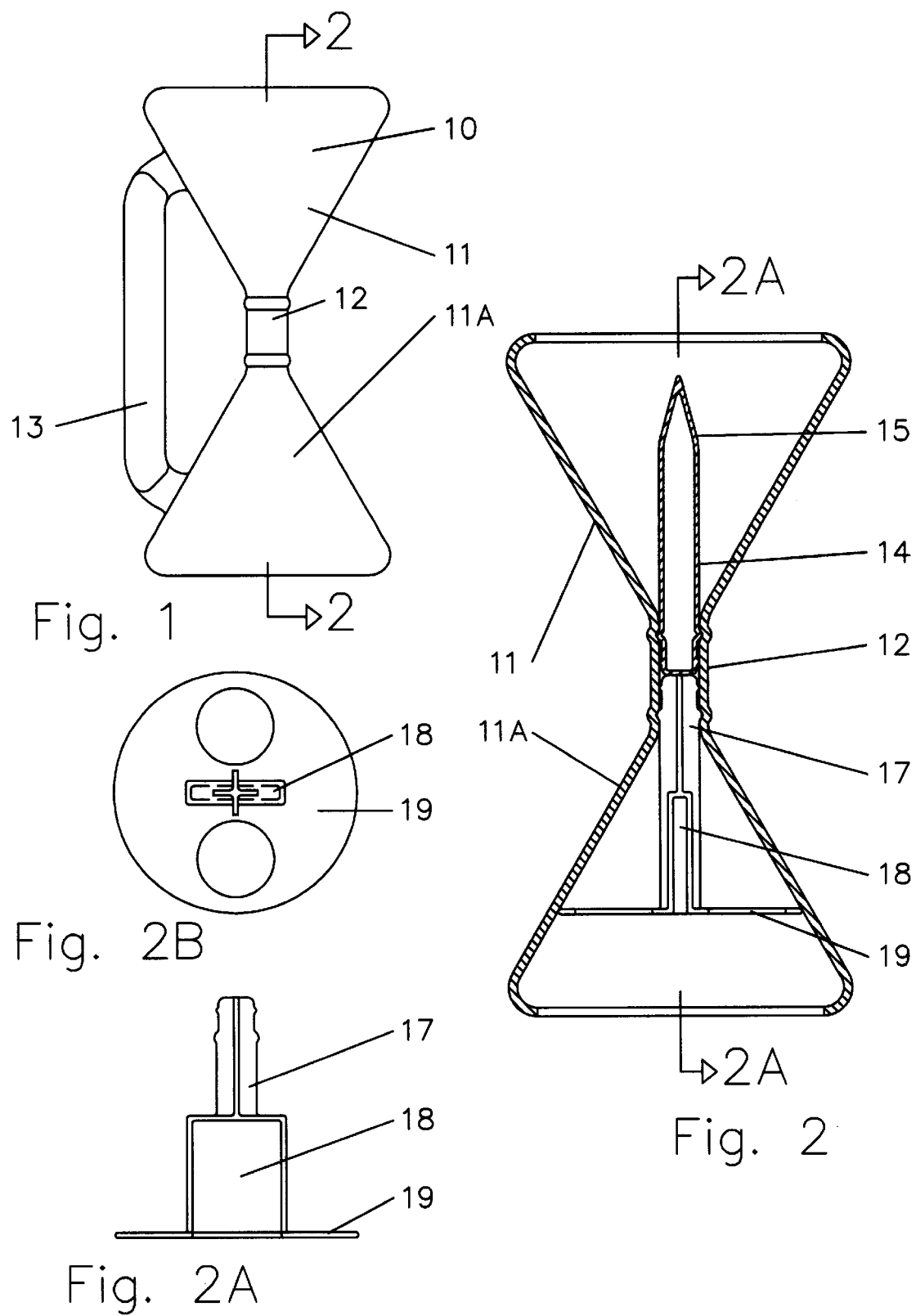

DRIPPING OBJECT HOLDER

BACKGROUND OF THE INVENTION

1. Field of the Invention

This invention relates to a dripping object holder which is used to hold dripping objects and prevent drippings from falling on the user or on another inappropriate place. The dripping object may be an edible food product such as a frozen confection, a pickle or a peach and may also be an object which the holder user is painting. The holder has opposing receptacles to catch drippings, each receptacle equipped with an appropriate dripping object support to accommodate a variety of dripping objects.

2. Related Prior Art

Holders for dripping objects, mainly frozen confection holders, are well known in the art. For example, U.S. Pat. No. 5,224,646 describes an ice cream receptacle that collects ice cream drippings that a user may drink. U.S. Pat. No. 3,459,296 describes a container for frozen food confections having a hollow, tubular handle that moves the confection upward as the confection is consumed. U.S. Pat. No. 2,980,039 describes a holder that includes a mold to make a frozen confection and a support for the frozen confection including a drip tray. U.S. Pat. No. 2,803,550 describes a cup having a bottom wall with an opening that receives a handle from a frozen confection. Finally, U.S. Pat. No. 2,162,224 describes a cone shaped receptacle that supports and elevates an ice cream cone None of the prior art holders described provide a holder designed to support and contain drippings from edible and inedible objects.

A primary object of the present invention is to furnish a user with an easily held, versatile holder that collects drips from more than one type of dripping object.

Another object of the invention is provide a holder with interchangeable object supporting structures that can expand the holder functions.

A further object of the invention is to provide a stable dripping object holder that can easily be held and then set down on a flat surface without additional support.

Finally, still another object of the invention is to provide an inexpensive and durable means for controlling messy drippings from a variety of objects such as frozen confections, juicy foods including but not limited to pickles and peaches and from paint filled brushes and freshly painted objects.

Other and further objects of the invention will become apparent as the description of the invention proceeds.

SUMMARY OF THE INVENTION

The dripping object holder of the present invention comprises oppositely disposed cone shaped receptacles joined at the cone receptacles' apexes by a hollow stem. Each cone shaped receptacle can have a cylindrical rod shaped object support structure, the cylindrical rod having a proximal end inserted within the cone receptacle apex hollow stem and projecting within the cone shaped receptacle from the cone apex outward, central to and lower than the cone rim circumference and having a pointed distal end portion. A dripping object, such as a pickle, can be impaled on the pointed cylindrical rod supporting structure and held securely while a user consumes the edible dripping object in a clean comfortable manner. The pointed cylindrical rod supporting structures can also be used to telescopically receive accessory supporting structures with distal ends designed to support a variety of dripping objects. For example, an accessory supporting structure can have a clip distal end used to support an object to be painted. The accessory object support structures can be telescopically affixed to the cylindrical rod in order to change the cylindrical rod distal end portion to accommodate a variety of dripping objects.

In another embodiment, a rod shaped insert with distal walls terminating at a circular plate, the walls defining a centrally located longitudinal slot deep enough to support and guide a handle such as those found on frozen confection bars, can be inserted into the cone shaped receptacle hollow stem. The present invention dripping object holder can have a variety of cone shaped receptacle support structure combinations such as cylindrical rod support structures in both cone shaped receptacles or one receptacle having a cylindrical rod structure while the other receptacle has a longitudinal slot support structure or both receptacles having longitudinal slot support structures.

For the pointed cylindrical rod object support structure, accessory object support structures can be telescopically affixed to the cylindrical rod in order to change the cylindrical rod distal end portion to accommodate a variety of dripping objects.

A handle, positioned and affixed to the oppositely disposed cone shaped receptacles, provides stable holding means. After using the holder, the user can place the dripping object holder on a supporting surface such as a table just as one would place a cup on a table. Then the holder can be reused. Most of the aforementioned dripping object holders cannot rest independently on a flat surface but have to constantly be held by a user. In addition, as an object drips into the cone receptacle, if the drippings are drinkable and desirable, the user can hold the object holder by the handle and drink the drippings as one would drink from a cup. In one embodiment, the cone shaped receptacles have lips with notches for placement of tubular members such as straws so that a user can consume drippings through the tubular member.

A user of the dripping object holder can secure a variety of objects such as pickles, fruits and frozen confections to the support structure, hold the dripping object holder by the handle and consume an object avoiding a mess from uncontrolled drippings. When an object is to be painted, a user can secure the object to a support structure, set the dripping object holder on a flat surface and hold the handle to stabilize the holder while the user paints the object.

The features already described can be further understood by reference to the following drawings.

BRIEF DESCRIPTION OF THE DRAWINGS

FIG. 1 is a front plan view of a preferred embodiment of the invention showing oppositely disposed cone shaped receptacles joined at the receptacles' apexes and a handle for holding and stabilizing the invention.

FIG. 2 is a sectional view taken along the line 2—2 of FIG. 1.

FIG. 2A is a sectional view taken along the line 2A—2A of FIG. 2.

FIG. 2B is a top view of a slotted object supporting structure.

DETAILED DESCRIPTION OF THE INVENTION

In FIG. 1, a front plan view of the invention, the dripping object holder 10 in a preferred embodiment comprises oppositely disposed cone shaped structures 11, 11A that collect drippings and are joined at the cone shaped structure's 11, 11A apexes to form a hollow stem 12 and a handle 13 affixed to the cone shaped structures 11, 11A for holding and stabilizing the dripping object holder 10. The handle 13 can have a C-shaped configuration so a hand can firmly grasp the dripping object holder 10.

Figure 3:
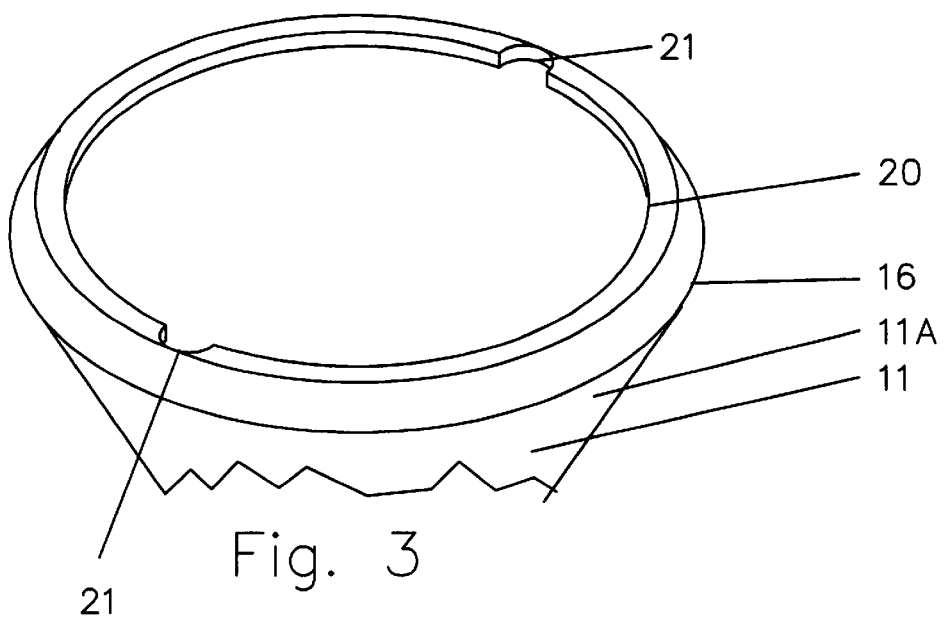
FIG. 3 is a top and/or bottom perspective view of another embodiment of the invention showing a notched lip on a cone shaped drip receptacle.

FIG. 2, a section through line 2—2 of FIG. 1, shows a cylindrical object supporting rod 14 that can be hollow or solid having slight proximal end bulges inserted into hollow stem 12 notches, the supporting rod 14 having a pointed distal end 15 for impaling soft objects such as pickles and peaches. The cylindrical rod 14 snaps into and projects outward from the cone shaped structure 11 apex so that the pointed distal end 15 is central to and below the cone shaped structure 11 circular base circumference 16 as seen in FIG. 3. In addition, an oppositely disposed cone shaped structure 11A contains a slotted object supporting insert 17 having a proximal end rod shaped member connected to distal end walls defining a slot 18, the slot 18 terminating centrally on a circular plate 19, the circular plate sized to fit snuggly within the cone shaped structure 11A inner surface. The object supporting insert 17 proximal end rod has slight bulges that can be inserted into the hollow stem 12 notches, the hollow stem 12 formed at the cone shaped structure's 11A apex joining cite. The circular plate 19 can be solid or can have at least one aperture so that drippings from a supported object can enter the apex of the cone shaped structure 11A and not spill out of the dripping object holder 10. The circular plate 19 can be inserted below the cone shaped structure 11A circular base circumference 16 so that slot 18 extends inward toward the cone shaped structure 11A apex. The slot 18 can have a vertical length deep enough to insert a frozen confection bar handle so that the frozen confection is solidly supported. The slot 18 width can be at least as wide as a frozen confection bar handle, usually about one eighth inch to one fourth inch wide.

In another embodiment, oppositely disposed cone shaped structures 11A have a rod with each end pointed, the rod 14 inserted into and through hollow stem 12 so that the solid rod 14 pointed distal ends 15 appear in each cone shaped structure 11A central to and below each cone shaped structure, 11A circular base circumference 16. In still another embodiment, both cone shaped structures, 11A can have slotted object supporting structures 17 snapped into hollow stem 12.

FIG. 3 illustrates a top and/or bottom perspective view of another embodiment of the dripping object holder 10 showing a lip 20 having notches 21, the lip 20 located along the circular base circumference 16 rim of the cone shaped structures 11, 11. Notches 21 can receive a hollow tube such as a drinking straw that a user utilizes to consume accumulated edible object drippings found in the cone shaped structure, 11A. Lip 20 prevents drippings from spilling when the holder 10 is tipped. In this embodiment, both or one of the cone shaped structures 11 can have lip 20 with notch 21.

Figure 4A:
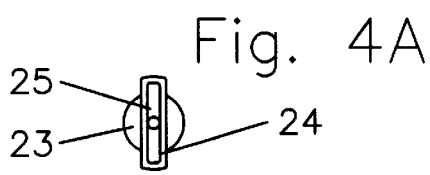
FIG. 4A is a top view of the accessory support structure shown in FIG. 4.
Figure 6A:
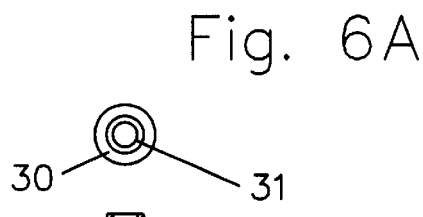
FIG. 6A is a top view of the accessory support structure shown in FIG. 6.
Figure 4:
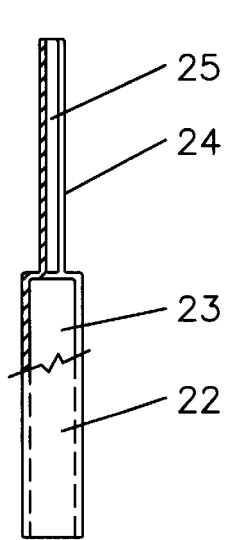
FIG. 4 is a partial cut away sectional view showing an accessory support structure with a distal end slot.
Figure 5:
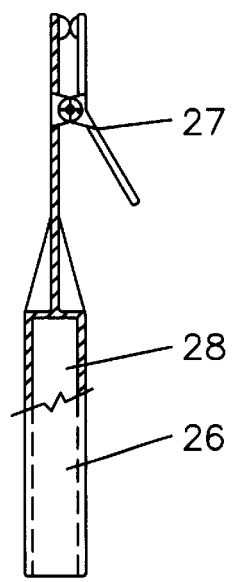
FIG. 5 is a partial cut away sectional view showing an accessory support structure with a distal end clamp.
Figure 6:
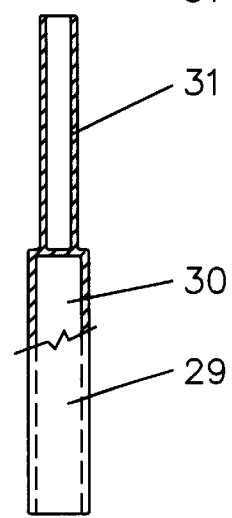
FIG. 6 is a partial cut away sectional view showing an accessory support structure with a distal end tubular member that receives round handles from confections such as lollypops and taffy apples

FIGS. 4, 4A, 5, 6 and 6A illustrate alternative support structures that can be telescopically joined to rod 14 to support a variety of objects. FIG. 4 illustrates an alternative support structure 22 having a proximal hollow tube member 23 that can be telescopically joined to rod 14, and a distal member 24 having walls defining a slot 25 for firmly holding and guiding a frozen confection bar handle. FIG. 4A illustrates a top view of alternative support structure 22 showing the distal member 24 defining slot 25. FIG. 5 illustrates another alternative support structure 26 having a distal end clamp 27 for securing objects to be painted such as small figures and pictures and a proximal end hollow tube member 28 that can be telescopically joined to rod 14. The distal end clamp 27 can be a spring operated clamp, a friction force operated clamp or function by any other means already known in the art. FIG. 6 illustrates another alternative support structure 29 comprising a proximal hollow tube member 30 that can be slipped over rod 14 and a stepped down distal tubular member 31 that can hold round handles such as those found on lollypops and taffy apples. FIG. 6A is a top view of the alternate support structure 29 showing the distal tubular member 31 and the proximal tubular member 30.

The dripping object holder 10 can be configured with a plurality of support structure 14, 17 combinations including having rod support structures 14 within both cone shaped structures 11, 11A having one cone shaped structure 11 with a rod support structure 14 and having one cone shaped structure 11A with an object supporting insert 17, and having both cone shaped structure with object supporting inserts 17.

Though particular embodiments of the present invention have been described, it will be appreciated by those of ordinary skill in the art that modification can be made to the form and structure of the invention without departing from the spirit and scope thereof.

I claim:

1. A dripping object holder comprising:
oppositely disposed cone shaped structures with open circular bases, said cone shaped structures having apexes joined to form a hollow stem;
vertical object support structures snapped into said hollow stem, each oppositely disposed cone shaped structure having a separate vertical object support structure; and
a handle affixed to said cone shaped structures.

2. The dripping object holder of claim 1 wherein at least one vertical object support structure is a rod with a pointed distal end, said rod projecting from said cone shaped structure apex outward and said pointed distal end being central to and below a circumference of said cone shaped structure open circular base.

3. The dripping object holder of claim 1 wherein at least one vertical object support structure has a rod shaped proximal member connected to distal walls defining a slot terminating centrally on a circular plate; said slot having an opening starting below said cone shaped structure open circular base and extending inward toward said cone shaped structure apex; said plate having at least one aperture.

4. A dripping object holder comprising:
oppositely disposed cone shaped structures, said cone shaped structures having apexes joined to form a hollow stem;

a handle affixed to said cone shaped structures; and at least one vertical rod shaped object support structure snapped within said hollow stem having a distal pointed end disposed to telescopically receive an accessory object support structure wherein said accessory object support structure is a proximal tubular member connected to a distal end clamp.

5. A dripping object holder comprising:

oppositely disposed cone shaped structures, said cone shaped structures having apexes joined to form a hollow stem;

a handle affixed to said cone shaped structures; and at least one vertical rod shaped object support structure snapped within said hollow stem having a distal pointed end disposed to telescopically receive an accessory object support structure wherein said accessory object support structure is a proximal tubular member connected to a distal stepped down tubular member.

6. A dripping object holder comprising:

oppositely disposed cone shaped structures, said cone shaped structures having apexes joined to form a hollow stem;

a handle affixed to said cone shaped structures; and at least one vertical rod shaped object support structure snapped within said hollow stem having a distal pointed end disposed to telescopically receive an accessory object support structure wherein said accessory object support structure is a proximal tubular member connected to a distal member having walls defining a slot.

\* \* \* \* \*